United States Patent [19]
Kush et al.

[11] Patent Number: 4,525,626
[45] Date of Patent: Jun. 25, 1985

[54] FIBER OPTIC VIBRATION MODAL SENSOR

[75] Inventors: Stephen T. Kush, Austin, Tex.; Marc E. Meffe, Phoenix, Ariz.

[73] Assignee: Sperry Corporation, New York, N.Y.

[21] Appl. No.: 361,274

[22] Filed: Mar. 24, 1982

[51] Int. Cl.³ .............................................. G02B 5/14
[52] U.S. Cl. ................................ 250/227; 350/96.29; 73/655
[58] Field of Search .......................... 250/227, 231 R; 350/96.15, 96.29; 73/583, 655, 657

[56] References Cited

U.S. PATENT DOCUMENTS

| | | | |
|---|---|---|---|
| 4,162,397 | 7/1979 | Bucaro et al. | 250/231 R |
| 4,339,661 | 7/1982 | Pitt et al. | 250/227 |
| 4,408,495 | 10/1981 | Couch et al. | 250/227 |

OTHER PUBLICATIONS

*Research Update on Fiber Optics*, J. H. Cole et al., Intl. Fiber Op. and Comm., vol. 2, No. 2, Mar. 1981, pp. 23-25.

*Primary Examiner*—David C. Nelms
*Assistant Examiner*—Ernest Austin, II
*Attorney, Agent, or Firm*—Howard P. Terry; Seymour Levine

[57] ABSTRACT

Dynamic behavior of structures subject to vibrations is monitored with light coupled into a single multi-mode optical fiber positioned within or on the structure. Vibration caused strain or deflections in the structure are detected by interference light signal intensity variations caused by differential phase changes in the transmission modes. These intensity variations are optically detected to provide an electrical output. Actuators may be positioned at the vibration nodes of the structure and energized by signals derived from the electrical output signals to suppress the vibrations.

18 Claims, 4 Drawing Figures

FIBER OPTIC VIBRATION MODAL SENSOR

BACKGROUND OF THE INVENTION

1. Field of the Invention

The invention pertains to fiber optic devices and more particularly to fiber optic structural modal sensors for monitoring the dynamic properties, such as vibration characteristics, of structures.

2. Description of the Prior Art

The advent of the shuttle transport system initiated consideration of a unique class of earth orbiting structures for on-orbit assembly. These structures may be very large and flexible, for on-orbit assembly does not require characteristics to withstand launch vibrations or 1g environments. To yield stable space platforms the flexure of these structures in the low frequency, high amplitude structural bending modes must be controlled. This control may be accomplished with various discreet actuators mounted on the structure. Identification of these structural modes and determination of modal excitation present difficult problems. Discreet sensors such as accelerometers, inertial reference platforms, and laser interferometers can detect structural mode excitation. The discreet nature of these devices, however, provide only localized information for the actuator system, thus many sensors per structure are required to maximize modal sensing capability.

Vibration monitoring devices may be desirable in systems other than space platforms. Helicopters, for example, possess large rotor blades that rotate at relatively high angular velocities. These rotation rates cause the blades to vibrate and flex, which under adverse conditions, may cause the blades to fail, thereby creating a hazardous situation.

Optical systems for the detections of variation in ambient conditions that utilize optical fibers excited by coherent light have been considered for structural vibration mode detecting sensors. An acoustic sensor of this type for sonar detection has been proposed by M. R. Layton and J. A. Bucaro in an article entitled, "Optical Fiber Acoustic Sensor Utilizing Mode/Mode Interference", Applied Optics, Vol. 18, No. 5, Mar. 1, 1979, and a strain gage utilizing this concept has been disclosed in U.S. Pat. No. 4,191,470 issued to C. T. Butler in March 1980.

Butler discloses a fiber optic strain gage wherein parallelly spaced, single mode optical fibers are attached to a beam for the length thereof to measure the strain thereon. Coherent light coupled to the fibers propagates therethrough to a detector responsive to light emitted therefrom. Strain or motion of the beam is determined by detecting the motion of an interfering pattern produced by phase difference variations of the light transmission in the fibers. This arrangement is relatively complex mechanically and optically; requiring two fibers that must be attached to the structure under observation and precision coupling of optical energy to and from the single mode fibers.

The Layton et al. acoustic detector utilizes a statistically positioned long length of multi-mode optical fiber wound into a coil. Coherent light, coupled to the input end of the optical transmission line in an optical detector, is coupled to the output end. Compression of the fiber diameter, caused by the acoustic waves, establish phase variations between propagating modes, thereby altering the light patterns produced by the interference between at least two of the modes. The optical fiber coil of Layton et al. is static, mode transmission characteristics being varied by the compression of the fiber diameter. Positioning such a device to detect structural vibrations presents a nearly insoluble problem.

SUMMARY OF THE INVENTION

In accordance with the principles of the present invention, vibration characteristics of a structure are determined by a single optical fiber attached to or imbedded in the structure in a predetermined pattern relative to the beams longitudinal dimensions and the characteristic resonant vibration bending modes of the structure. This pattern is arranged to prevent cancellation of optical signal phase variations induced by even order structural vibration modes. A light beam is launched at the input end of the fiber to propagate therethrough in at least two modes. These modes form interference patterns, at the end of the fiber, with intensities that vary as functions of the vibration modes of the structure. The intensity modulated light is coupled to a light detector wherefrom electrical signals are provided that are representative of vibration modal resonances. These electrical signals may then be coupled to appropriately positioned actuators on the structure for applying torques thereto to dampen the vibrations.

DESCRIPTION OF THE PREFERRED EMBODIMENTS

A monochromatic diverging light beam coupled to an optical fiber with a cone angle that subtends the numerical aperture of an optical fiber launches a multiplicity of propagating modes, each having a phase constant that is characteristic of the mode. These phase constants, which generally differ for each mode, establish phase differences between the modes that cause interference patterns, in a plane perpendicular to the fiber axis, which are functions of the distance from the fiber input end. When the fiber is stretched or contracted, the length variation causes the interference pattern in the plane to vary, thus altering the light intensity thereat. Stress variations applied to the fiber cause the length thereof to vary and thereby cause a light intensity modulation, which is a function of the stress variation, that may be detected to determine the variation frequency.

Figure 1:
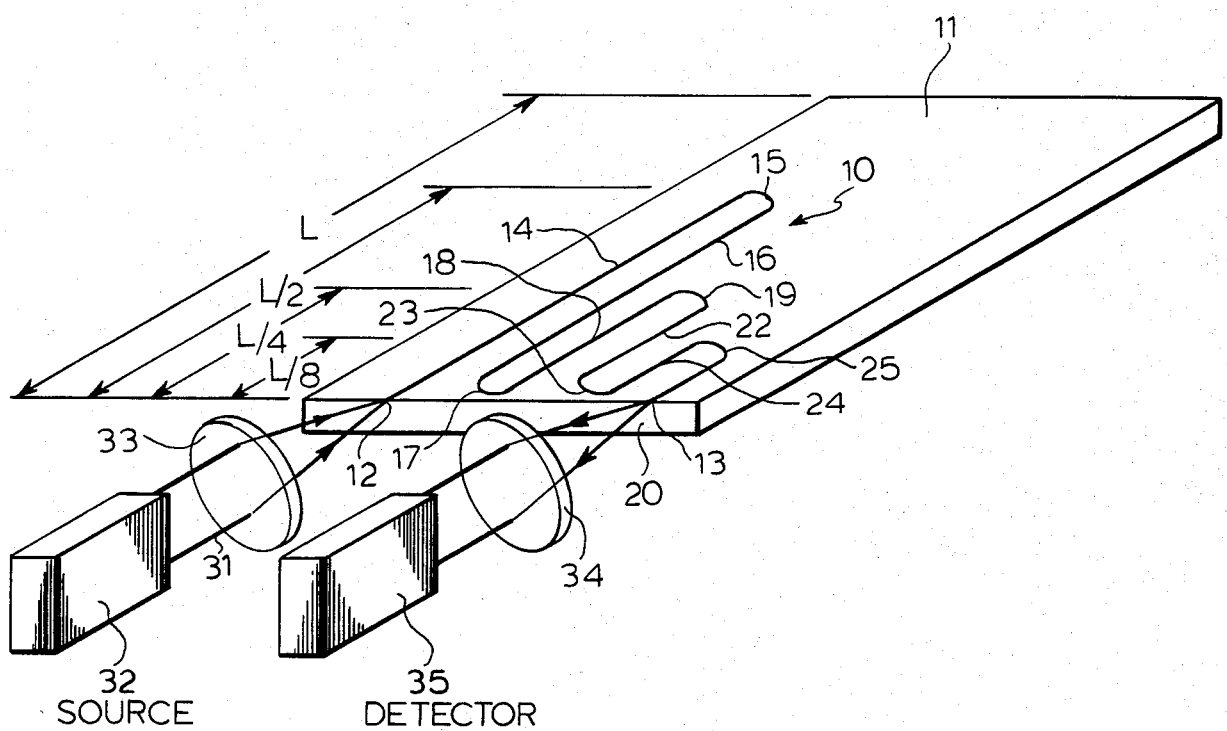
FIG. 1 is an illustration of the invention positioned in a simple mechanical beam.

Referring now to FIG. 1, there is illustrated an embodiment of the invention wherein a single fiber 10, capable of supporting a multiplicity of propagating optical modes, is placed on or imbedded near the surface of a structure 11, such as a beam, the vibrational modes of which are to be determined. This fiber traverses a serpentine path from the input end face 12 to the output end face 13. A first section 14 of the serpentine path proceeds from the input end face 12 to a turning point 15 that is at a distance from the end face 12 which is substantially equal to half the length of the structure for which the vibration modes are to be determined. At point 15 the fiber is turned through 180° and is run along a path 16 towards an end surface 20 of the structure 11 until it reaches a point 17, near the end surface 20, whereat it is once again turned through 180° to traverse a path 18 which is in the direction of and substantially parallel to the path 14. At a point 19, located a distance from the end surface 20, which is substantially equal to ¼ of the length of the structure, the fiber is again turned through 180° and is run along path 22 to a turning point 23 near the end surface 20 and turned thereat to run along path 24 to a final turning point 25 located at a distance substantially equal to ⅛ the length of the structure from the end surface 20 wherefrom it is run along path 26 to position the output end face 13 at the desired location at the end surface 20.

A substantially collimated beam 31 from a substantially monochromatic source 32 may be focused by a lens 33 to the input end face 12 of the optical fiber 10 such that at least two optical modes propagate therewithin. These modes propagate through the optical fiber 10, emerge from the output end face 13 and may be incident, to a lens 34, wherefrom a substantially collimated beam may be incident to a light detector 35.

Figure 2:
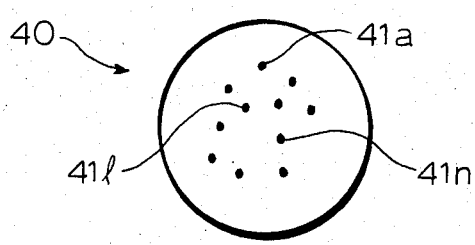
FIG. 2 is an illustration of an interference pattern formed at the end face of an optical fiber by propagating light modes.

With the structure 11 in a quiescent state, propagating modes within the optical fiber 10 produce an interference pattern 40 at the output end face 13 such as that shown in FIG. 2. At the output end face the phase of the $i^{th}$ mode wave $\phi_i$ is given by $$\phi_i = \beta_i s + \psi_i,$$

where $\beta_i$ is the phase constant of the $i^{th}$ mode, s is the length of the fiber, and $\psi_i$ is the relative phase of the $i^{th}$ mode at the input end face. Each of the points 41a through 41n represent crossing points of modes whereat the light intensity is a function of the phase difference, $$\phi_j - \phi_k = (\beta_j - \beta_k)s + (\psi_j - \psi_k).$$

When the structure 11 is quiescent the light intensity coupled from the output end face 13 is constant thus establishing a dc signal at the output terminals of the detector 35. When the structure 11 is vibrating the fiber experiences stress variations at the vibration frequency. These stress variations cause the phases at the points 41a through 41n to vary at the vibration frequency. For small displacements this variation may be determined from $$d/dt(\phi_j - \phi_k) = (\beta_j - \beta_k)ds/dt.$$

Since ds/dt is a function of the beam 11 vibration this variation causes the intensity at the interference points 41a through 41n to vary as a function of the beam 11 vibration, thus establishing an output signal from the detector 35 that is representative thereof.

Figure 3:
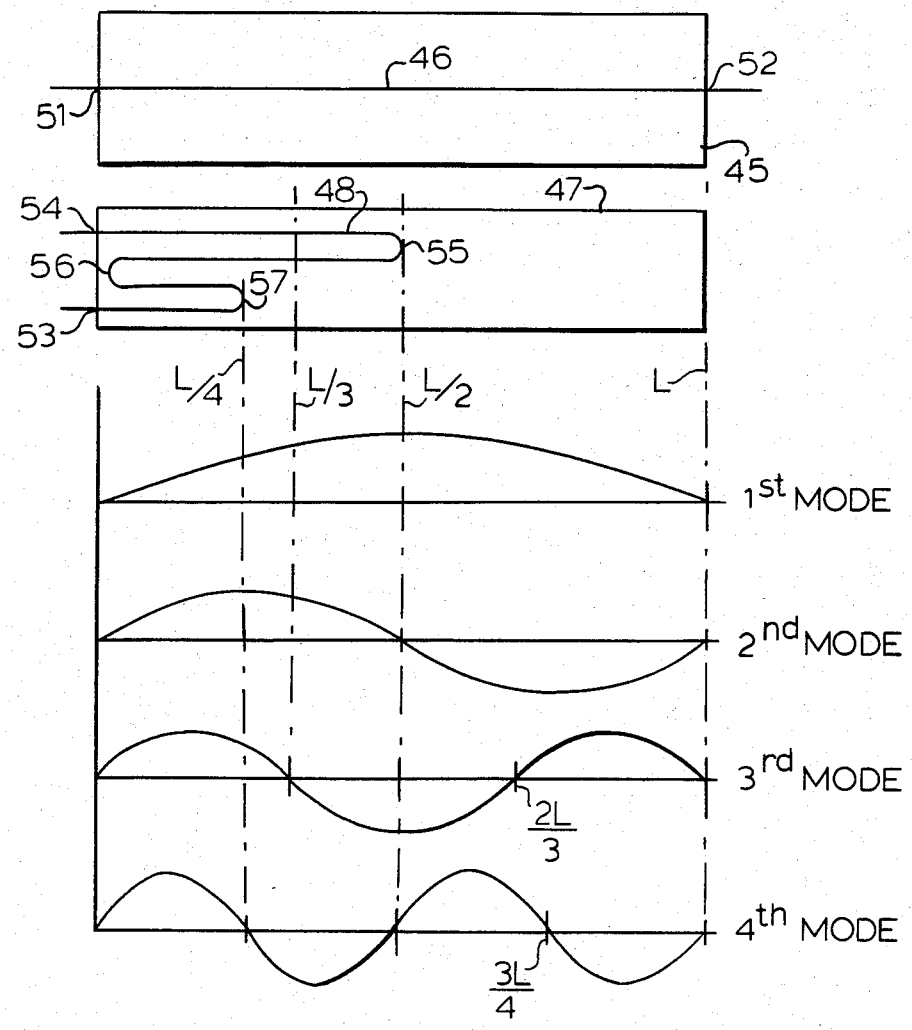
FIG. 3 is a composite illustration of fiber layout patterns and a number of characteristic beam vibration modes.

Refer now to FIG. 3 wherein a structure 45 with a single optical fiber 46 traversing the length thereof, a structure 47 with an optical fiber 48 traversing a two turning point serpentine path coupled thereto, and waveforms of the first four structural vibration modes for the beams 46 and 47 are shown. When the structure 45 is vibrating in the first mode the strain applied to the optical fiber 46 in unidirectional. This stress causes phase variations at the interfering points in the output end face 52 of the optical fiber 46 for optical signals propagating thereto from the input end face 51. These phase variations establish an intensity variation at a frequency that is a function of the structural vibration frequency. It is evident from FIG. 3 that the second structural vibration mode is antisymmetric about the center of the structure. This antisymmetry causes equal and opposite strains to be applied about the center of the optical fiber 46, thus equally elongating and contracting the fiber on either side of the center. Thus, increases in the signal phase angle caused by elongation of the fiber on one side of the center of the structure are cancelled by decreases in the signal phase angle due to the contraction of the fiber on the other side. From the above it should be apparent that two lobes of the third structural mode do not contribute to the phase angle variations at the output end face 52 and that the phase angle variations thereat are caused by the remaining one of the two lobes that are shown with positive amplitude for the third structural mode in FIG. 3.

The serpentine path of the optical fiber 48 on the structure 47 in FIG. 3 may be utilized to provide phase angle variations in response to structural mode vibrations of the structure 57, at the output end face 53 for signals coupled through the input end face 54. This serpentine path has its first turning point 55 at a distance from the input end face 54 that is substantially equal to ½ the length of the structure. It is evident from the figure that the strain applied to the first loop, i.e. from the input end face 54 through the first turning point 55 to the second turning point 56, are in the same direction throughout the loop for the first and second modes, while for the third mode the loop traverses the first lobe and ½ the second lobe, wherein the strain on the optical fiber is in phase opposition to the strain on the optical fiber from the first lobe. Thus, significant phase angle variation cancellation is realized for the third structural vibration mode along the first loop of the serpentine path. Further inspection of FIG. 3 indicates that the second loop of the serpentine path, i.e. from the second turning point 56 through the third turning point 57 to the output end face 53, lies in a region of the structure wherethrough the strains applied to the optical fiber for the first four vibration modes are unidirectional. Thus phase angle variations appear at the interference points of the output end face 53 for all four modes from the strains applied to the section of the optical fiber 48 within the path of the second loop as a result of the structural vibration. It should be recognized that greater sensitivity to first and third structural vibration modes may be obtained by including a loop with a turning point substantially at a distance L from the input end face and by extending the turning point 57 to be at a distance L/3 from the input end face. By modifying the serpentine path in this manner complete lobes of unidirectional strain for each of the three structural vibration modes are traversed by a loop in the serpentine path. It should be apparent from the above than whenever a turning point is at a distance L/n from the plane of the input end face of the optical fiber where n is the order of a structural vibration mode, the loop established thereby traverses a region of unidirectional strain, as illustrated in FIG. 3 for the second and fourth modes. An economy of optical fiber, however, may be realized by positioning the turning points at distances $L/2t$, $t = 1, 2, 3, \ldots$, from the plane of the input end face of the optical fiber as illustrated in FIG. 1. Though FIGS. 1 and 3 show serpentine paths for optical fibers with the input and output end faces positioned at the same end of the structure, this is not limitative. Serpentine paths may be constructed with the input and output end faces positioned at opposite ends of the structure. Additionally, though 180° turns about the turning points are described, this is also not limitative. Serpentine paths with turns less than 180° may be constructed to provide desired modal vibration coverages.

Figure 4:
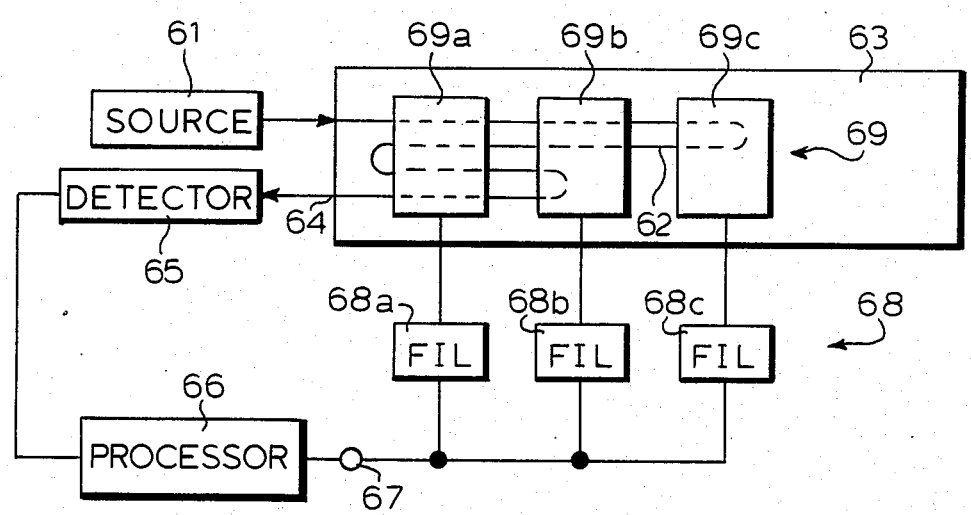
FIG. 4 is a schematic illustration of an embodiment of the invention wherein actuators, responsive to output signals from a structural vibration modal sensor, are appropriately positioned on the beam to suppress beam vibrations.

Structural vibration modal detection may be utilized to dampen the vibrations, thereby increasing structural stability. A block diagram of a system that may be employed to provide the damping is shown in FIG. 4. An optical source 61 couples a substantially monochromatic signal to an optical fiber 62 positioned along a serpentine path on or near the surface of the structure 63 for which vibration damping is desired. An optical signal with a modulated light intensity, produced in the manner previously described, is coupled from the output end face 64 of the optical fiber 62 to a detector 65, wherefrom a signal representative of the light intensity modulation is coupled to a processor 66. Processor 66 analyzes the received signal to determine the structural vibration modes generated by the vibration of the structure 63 and provides a signal at an output terminal 67 for each structural vibration mode detected. The multiplexed signals at the output terminal 67 are coupled to a demultiplexer, which may be a bank of filters 68, wherein the frequencies are separated and coupled to actuators 69, each positioned for damping a predetermined structural vibration mode. The actuators, which may be gyros control moment gyros, reaction wheels, solenoids, etc., produce torque, in response to the signal coupled thereto from the corresponding filter, that tends to cancel the bending of the structure 63 at the position of the actuators, thereby damping the structural vibration mode that gave rise to the signal coupled from the filter bank 68 to the excited actuator, as for example from filters 68c to actuator 69c.

While the invention has been described in its preferred embodiments, it is to be understood that the words that have been used are words of description rather than of limitation and that changes within the purview of the appended claims may be made without departing from the true scope and spirit of the invention in its broader aspects.

We claim:

1. An apparatus for monitoring vibration modes of a structure having first and second ends comprising:
   an optical fiber positioned along a serpentine path on said structure, having an input end face adjacent said first end of said structure and an output end face, said serpentine path having turning points located at predetermined distances selected from a sequence of distances defined by L/n, where L equals the length of said structure n=1, 2, 3, . . . from said first end, and arranged to position said input and output end faces of said optical fiber adjacent said first end, and
   means for launching at least two propagating optical modes in said optical fiber such that a temporal intensity modulated signal responsive to said vibration modes appears at said output end face; and
   means coupled to receive said temporal intensity modulated signal from said output end face for detecting intensity modulation thereof and providing output signals representative of said intensity modulation.

2. An apparatus in accordance with claim 1 wherein said turning points at said predetermined distances turn said serpentine path through substantially 180°.

3. An apparatus in accordance with claim 1 wherein said turning points adjacent said first end turn said serpentine path through substantially 180°.

4. An apparatus in accordance with claim 1 wherein said turning points adjacent said first end turn said serpentine path through substantially 180°.

5. An apparatus for monitoring vibration modes of a structure in accordance with claim 1 wherein said optical fiber traverses a serpentine path having at least one turning point at predetermined distances from said first end and at least one turning point adjacent said first end, said turning points at said predetermined distances and said turning points adjacent said first end being equal in number, said serpentine path arranged to position said input end face of said optical fiber adjacent said first end and said output end face of said optical fiber adjacent said second end.

6. An apparatus in accordance with claim 5 wherein said turning points at said predetermined distances turn said serpentine path through substantially 180°.

7. An apparatus in accordance with claim 6 wherein said turning points adjacent said first end turn said serpentine path through substantially 180°.

8. An apparatus in accordance with claim 5 wherein said turning points adjacent said first end turn said serpentine path through substantially 180°.

9. An apparatus for monitoring vibration modes of a structure including:
   an optical fiber positioned on said structure, having an input end face adjacent an end of said structure and an output end face;
   means for launching at least two propagating optical modes in said optical fiber such that a temporal intensity modulated signal responsive to said vibration modes appears at said output end face;
   means coupled to receive said temporal intensity modulated signal from said output end face for detecting intensity modulation thereof and providing output signals representative of said intensity modulation;
   processor means coupled to receive said output signals from said detection means for providing signals representative of vibration modes of said structure; and
   a plurality of actuators, each coupled to receive and responsive to one of said vibration mode representative signals, positioned on said structure for suppressing vibration modes corresponding to said representative signal.

10. An apparatus in accordance with claim 9 further including demultiplexing means coupled between said processor means and said plurality of actuators for coupling each mode representative signal to an actuator positioned to suppress vibrations corresponding to said coupled representative signal.

11. An apparatus for monitoring vibration modes of a structure having first and second ends comprising:
   an optical fiber positioned along a serpentine path on said structure, having an input end face adjacent said first end of said structure and an output end face, said serpentine path having turning points located at predetermined distances selected from a sequence of distances defined by L/2t, where L equals the length of said structure t=1, 2, 3, . . . from said first end points adjacent said first end that are one less in number than said at, and arranged to position said input and output end faces of said optical fiber adjacent said first end; and means for launching at least two propagating optical modes in said optical fiber such that a temporal intensity modulated signal responsive to said vibration modes appears at said output end face; and means coupled to receive said temporal intensity modulated signal from said output end face for detecting intensity modulation thereof and providing output signals representative of said intensity modulation.

12. An apparatus in accordance with claim 11 wherein said turning points at said predetermined distances turn said serpentine path through substantially 180°.

13. An apparatus in accordance with claim 12 wherein said turning points adjacent said first end turn said serpentine path through substantially 180°.

14. An apparatus in accordance with claim 11 wherein said turning points adjacent said first end turn said serpentine path through substantially 180°.

15. An apparatus for monitoring vibration modes of a structure in accordance with claim 11 wherein said optical fiber traverses a serpentine path having at least one turning point at predetermined distances from said first end and at least one turning point adjacent said first end, said turning points at said predetermined distances and said turning points adjacent said first end being equal in number, said serpentine path arranged to position said input end face of said optical fiber adjacent said first end and said output end face of said optical fiber adjacent said second end.

16. An apparatus in accordance with claim 15 wherein said turning points at said predetermined distances turn said serpentine path through substantially 180°.

17. An apparatus in accordance with claim 16 wherein said turning points adjacent said first end turn said serpentine path through substantially 180°.

18. An apparatus in accordance with claim 15 wherein said turning points adjacent said first end turn said serpentine path through substantially 180°.

* * * * *